Figure 1:
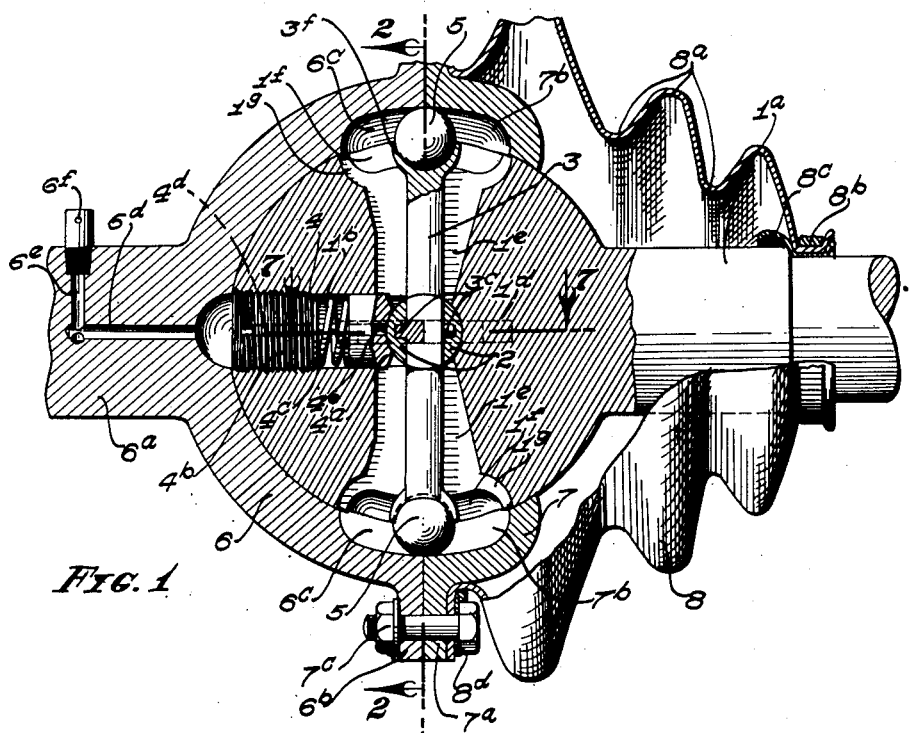

March 1, 1932.  L. STERNBERGH  1,847,677
UNIVERSAL JOINT
Filed March 26, 1929  2 Sheets-Sheet 1

INVENTOR.
LAMBERT STERNBERGH
BY A.B.Bowman
ATTORNEY

March 1, 1932.                L. STERNBERGH                1,847,677
                               UNIVERSAL JOINT
                            Filed March 26, 1929          2 Sheets-Sheet 2

INVENTOR.
LAMBERT STERNBERGH
BY A.B.Bowman
ATTORNEY

Patented Mar. 1, 1932

1,847,677

UNITED STATES PATENT OFFICE

LAMBERT STERNBERGH, OF SAN DIEGO, CALIFORNIA

UNIVERSAL JOINT

Application filed March 26, 1929. Serial No. 349,937.

My invention relates to universal joints and the objects of my invention are: First, to provide a universal joint in which a ball member and a socket member are interlocked so as to transmit rotary motion from one to the other; second, to provide a universal joint of this class in which the driven side may be shifted a maximum number of degrees relative to the driving side with a minimum loss of power; third, to provide a universal joint of this class in which the efficiency remains approximately constant through the whole range of movement of the one portion of said joint relative to the other portion thereof; fourth, to provide a novel means for interlocking a ball and socket joint so as to form a universal joint thereof; fifth, to provide a universal joint of this class in which any desired number of spherical key members may be used to interlock the socket relative to the ball member of said joint; sixth, to provide a universal joint in which the spherical key members roll at all times, thereby eliminating practically all sliding friction, thus facilitating the maintaining of an oil film between said spherical key members and the adjacent portions of the universal joint; seventh, to provide a universal joint of this class in which the spherical or ball key members are always maintained in a plane bisecting the obtuse angle between the axes of the shafts of the driving and driven sides of said universal joint, thereby eliminating any danger of the joint binding; eighth, to provide a universal joint in which keyways are provided in both socket and ball member of said joint so as to enable the spherical key members to position themselves automatically in proper relation for transmitting the movement of said socket member to said ball member, or from said ball member to said socket member; ninth, to provide a universal joint of this class in which the various portions may fit extremely tight without materially increasing the friction loss, thereby eliminating relative movement which may cause whipping; tenth, to provide a novel spider or retainer means mounted within the ball member of a ball and socket universal joint for supporting spherical key members so as to maintain them in a common yet shiftable plane, and eleventh, to provide a universal joint of this class which is simple of construction proportional to its functions, durable, efficient in its action and which will not readily deteriorate or get out of order.

Figure 2:
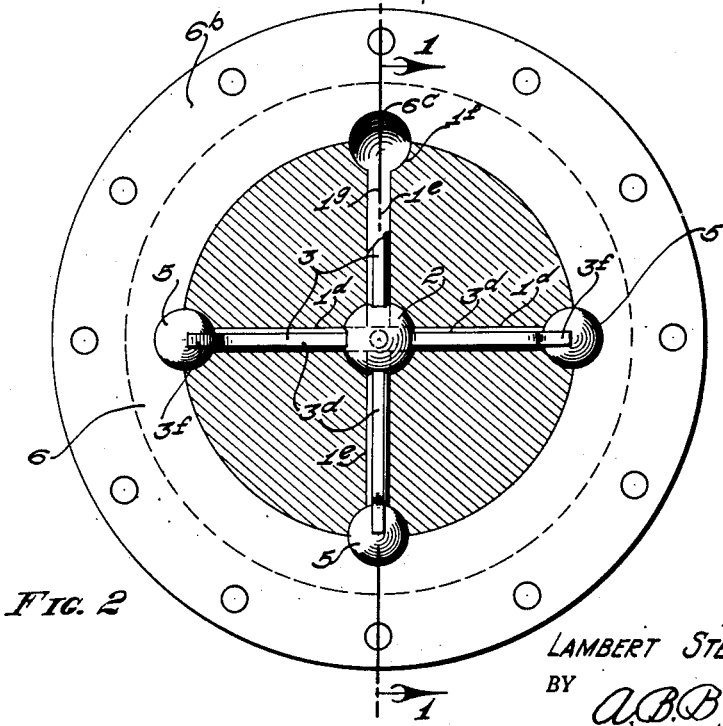
Figure 3:
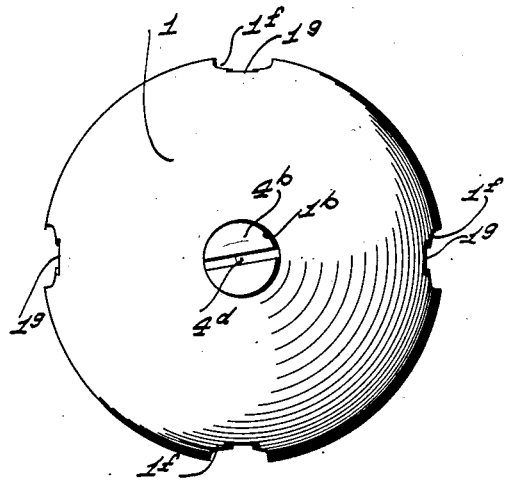
Figure 4:
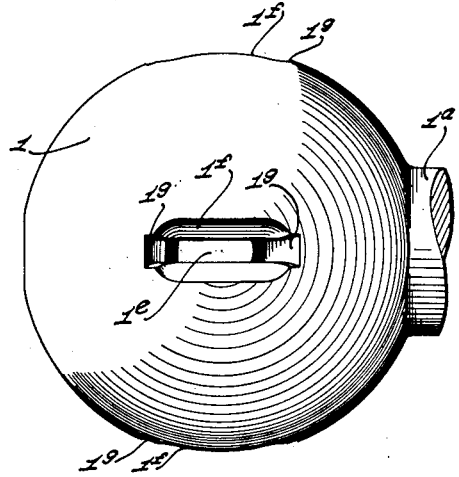
Figure 5:
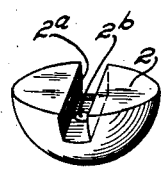
Figure 6:
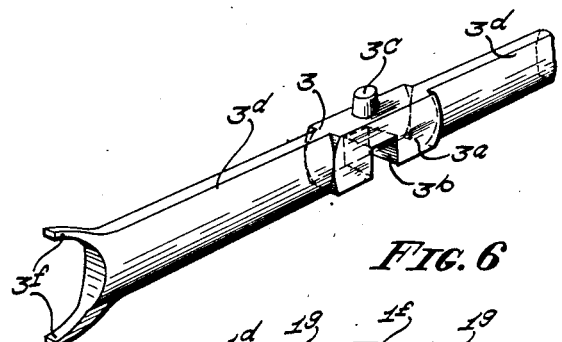
Figure 8:
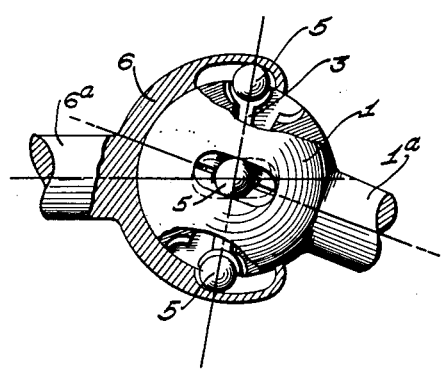
Figure 7:
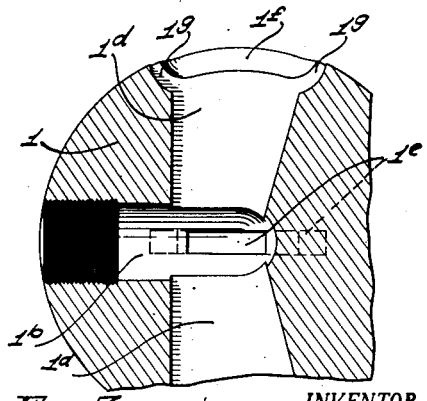

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a sectional view of my universal joint taken substantially through 1—1 of Fig. 2 with parts and portions shown in elevation and the shaft joining the joints shown in alined relation to facilitate the illustration; Fig. 2 is a transverse sectional view thereof through 2—2 of Fig. 1 with parts and portions shown in elevation to facilitate the illustration; Fig. 3 is an elevational view of the extended end of the ball member; Fig. 4 is a side elevational view of the ball member with the shank thereof broken away and in section; Fig. 5 is a perspective view of one of the retainer hub segments; Fig. 6 is a fragmentary perspective view of one of the retaining arm members; Fig. 7 is a fragmentary sectional view of the ball member taken through 7—7 of Fig. 1 with the retaining means, key members and plug means removed; and Fig. 8 is a reduced substantially diagrammatic view of my universal joint showing the shanks of the ball and socket members at an angle with each other with parts and portions broken away and in section to facilitate the illustration.

Similar characters of reference refer to similar parts and portions throughout the several views of the drawings.

Ball member 1, retainer hub segments 2, retainer arm members 3, plug means 4, spherical keys 5, socket member 6, retaining ring 7, and sealing means 8, constitute the principal parts and portions of my universal joint.

The ball member 1 is relatively large and is made as nearly spherical as possible except for a shank portion 1a of circular cross section which extends therefrom. This shank is connected to a suitable mechanism capable of receiving or imparting rotary motion, depending upon whether the ball is used for the driven or driving side of the joint. Drilled into the ball member as near in alinement with the axis of the shank 1a as possible, and on the opposite side therefrom, is a recess 1b, as shown best in Fig. 7. The inner end of this recess terminates in a spherical portion the center of which is as nearly identical as possible with that of the spherical ball member 1.

Two slots extend at right angles to each other through the ball member so as to intersect the recess portion 1b. These slots are also at right angles to the axis of the shank 1a. These two slots 1d and 1e form four intersections with the periphery of the ball member. At each of these intersections the ball member is provided with a channel or keyway 1f having a semi-circular cross section as shown best in Fig. 2. A plane through the longitudinal axis of each of these keyways 1f intersects the axis of the shank 1a. The height of these slots 1d and 1e is considerably less than the distance across their respective keyways or channel portions 1f, as shown best in Fig. 4. These channels 1e and 1f are widened at their extended ends, as shown best in Figs. 1, 4 and 7 forming arcuate recess portions 1g in the end margins of each keyway 1f. The side walls of these recesses 1g diverge outwardly toward the periphery of the ball member 1, as shown best in Fig. 4. The purpose of this will be described hereinafter.

Two retainer hub segments 2 are provided. These two hub segments are identical in structure. Each hub segment is semi-spherical in shape. Extending transversely across the flat base of each hub and centered relative thereto is a slot 2a. Centered relative to the base of this slot is a small socket 2b.

Two retainer arm members 3 are provided which are identical to each other in structure. The central portion of each arm is rectangular in cross section and has twice the height of the slot 2a in the hub segments 2. This rectangular portion 3a is provided with a centered transversely extending slot 3b in its one side, as shown best in Fig. 6. The other side of said rectangular portion 3a opposite this slot is provided with an integral peg portion 3c. Integral with and extending from each end of the rectangular portion 3a is an arm 3d in which the wider or side surfaces are curved, as shown in Fig. 6, the purpose of which will be described hereinafter. The extended end of each arm 3d is provided with two prong portions 3f the inner surface of which together with the ends of the arms 3d form a narrow semi-circular surface adapted to receive a spherical key member to be described hereinafter. The ends of the portion of rectangular cross section 3a which are uncovered due to the curvature of the arms 3d, are adapted to form a continuation of the retainer hub segments 2, as shown in Fig. 1.

One of the hub segments 2 is positioned in the semispherical end 1c of the recess 1b with its slot 2a in alinement with the slot 1e, as shown in Fig. 1. One of the retainer arm members 3 is inserted in the slot 1e, it being noted that the side of this slot opposite the base of the recess 1b is cut away so as to provide sufficient width between the bottom of the slot 2a and the side margin of the slot 1c for receiving the pronged end of the retainer arm. This arm is inserted until the peg portion 3c can be pressed into the recess 2b, as shown in Fig. 1. When in this position the extended ends of the prongs 3f are just within or flush with the periphery of the ball member 1. Next the other arm 3 is inserted in the slot 1d. By a comparison of Figs. 1 and 7 it will be noted that the slot 1d is cut away further than the slot 1e so that there is sufficient space between the side margin of the slot 1d and the base of the notch 3b in the first arm 3 to permit the passage of the pronged end of the other arm 3. When the second hub segment is inserted in the recess 1b in such a manner that its slot 2a fits over the central portion of the last mentioned arm 3 and the socket 2b fits over the peg portion 3c thereof. When these four members are positioned together a retainer member is formed having four extending arms mounted in a hub spherical except for these arms. This is shown best in Fig. 2.

A plug means 4 is provided which consists of a seating plug 4a having a semi-spherical seating portion at its one end, as shown in Fig. 1. As the various arms 3 reciprocate in their respective slots the seating portion of the seating plug 4a cannot take up the full cross section of the plug, therefore the plug is beveled around the margins of the seating portion, as shown in Fig. 1.

The recess 1b is preferably threaded for a portion of its distance and is adapted to receive a tension adjusting plug 4b, the outer end portion of which is provided with corresponding threads. A transverse slot or other means is provided in the outer face of this latter plug 4b for receiving a suitable tool. A spring 4c is placed between these two plugs for maintaining resilient contact against the hub of the retaining means.

As can be seen best in Figs. 1 and 2 the pronged ends 3f of the retainer arm members extend into their respective keyways 1f in alinement with the longitudinal axis thereof when the axes of the several arms 3d are on a plane at right angles to the axis of the shaft 1a. A spherical key member is adapted to fit between each pair of prongs 3f. Each of these spherical key members extends about half way out its keyway.

A semi-spherical socket member 6 is adapted to fit over the ball member 1. A shank 6a extends from this socket member at right angles and in opposite direction to the face thereof, as shown in Fig. 1. The face of the socket member is provided with a flange 6b. A ring member 7 having an outwardly extending flange 7a corresponding to the flange 6b fits against the face of the socket member 6. The ring member 7 forms a continuation of the socket member and retains the ball member 1 therein. The socket member 6 is provided with four channels or keyway portions 6c each of which extends in a plane which intersects the axis of the shank 6a. These keyways intersect the face of the socket member and aline with the corresponding keyways 7b provided in the ring 7. The keyways 6c and 7b are adapted to complement the keyways 1f and receive the extended portion of the spherical key members 5, as shown best in Figs. 1 and 2 of the drawings.

Secured to the flanges 7a by means of the bolts 7c which hold the ring to the socket member is a sealing means 8. This sealing means may be formed of leather or other similar material. The sealing means extends from the flange 7a over the shank 1a in spaced relation thereto to a point spaced from the ball member 1. Here the shank is slightly reduced in cross section and a clamp 8a is provided around the sealing means 8 for forming a fluid tight joint between the sealing means and the shank 1a, as shown in Fig. 1. This sealing means which may be formed of leather or other flexible material is provided with a number of folds 8b which permit the maximum movement of the shank 1a relative to the shank 6a without stretching the sealing means or causing it to come in contact with the shank and wear excessively. Suitable guard means 8c may be provided at the point around the shank 1a for preventing the sealing means from rupturing at that point. Also the guard means 8d may be provided between the bolts 7c and the sealing means, as shown in Fig. 1.

The shank 6a of the socket member 6 is provided with a small longitudinal bore 6d and a transversely extending bore 6e intersecting the longitudinal one. The transversely extending bore 6e is provided with an oiling or greasing member preferably of high pressure type. Where the longitudinally extending bore 6c intersects the inner margin of the socket portion of the socket members it is enlarged forming a chamber 6f.

Lubricant forced to the chamber 6f is distributed through holes 4d and 4e in the plugs 4b and 4a, respectively, to the hub of the retaining means, from where it passes out the slots 13 and 1f to the key members 5. Other lubricant is forced between the socket member 6 and ball member 1. The space between the sealing means 8 and ball member 1 is supplied with lubricant so as to prevent the lubricant in the joint from being thrown out when the shafts 1a and 6a are at an angle to each other.

The members of a pair of keyways comprising a socket member 6 and its corresponding keyway in the ball member 1 are only centered longitudinally with each other when a plane can be passed through the axes of both the shaft portions 1a and 6a. For any given relative position of the socket member and ball member, except when the shafts 1a and 6a are in alinement with each other, only the members of two pair of oppositely disposed keyways can be in alinement at a time. The members of the other two pair are in angular relation to the same degree as the projection of the axes of the two shafts to the surface of said ball member. The angular relation between the members of a pair of keyways is indicated in Fig. 8 by the superposed dotted lines over the solid outline of a keyway channel 1f.

If the several key members are maintained in a plane which bisects the obtuse angle between the two shafts, the rotary motion of the socket member may be transmitted to the ball member through the key members without possibility of binding or locking the joint. The only time that these key members can shift so as to bind the joint occurs when the same plane passes through the axes of the shafts 1a and 6a. At all other times the two keyways for each key member form two wedges, on opposite sides of the key members which force said key member to center itself relative to the keyways. This centered position is in the plane which bisects the angle between the axes of the shafts 1a and 6a, as can be observed from the line drawn through the three key members in Fig. 8.

Without the retainer means, the key members will be held substantially in a common plane by their keyways due to the pinching or wedging action thereof, but in order to do so the keyways are under constant strain which is uneven in its nature, causing laxity of alinement and the excess strain on the various parts. The retainer means equalizes the strains due to wedging and maintains the key members in accurate relation to their common plane. The tension provided at the hub of the retainer means prevents the key members from pivoting out of their proper plane during the very small instants at which any shifting could happen.

It will be noted that there is substantially the same amount of bearing surface in the keyways 1f as there is in the keyways in the socket member, therefore the various key members roll in both keyways and in their respective retainers, thus reducing friction to a minimum.

It is obvious that any other number of key members may be used by merely molding more slits and keyways in the ball 1 and more keyways in the socket 6 and providing more arms adapted to intersect each other at their central portions.

In this connection it will be noted that if three key members are used not more than one key at any time can be in the position so as to shift out of plane and bind the joint. This cannot happen as the hub of the retainer means and the other two keys determine the desired plane. If more than four keys are used the same applies, as there will be a sufficient number of balls held in the correct position so as to determine a plane even though some of the members may be in a position so as to shift if the retainer means were omitted.

The side surfaces of the arm portions 3d of each retainer arm are curved so as to permit the twisting of one retainer arm due to the reciprocating motion of the other retaining arm. For the same reason the ends of the recesses 1c are enlarged so as to permit the slight twisting movement of the prongs 3f.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a universal joint, a ball member, keyways formed in the periphery thereof, a socket member adapted to fit partially around said ball member, keyways formed in the inner surface thereof adapted to register with the keyways in said ball member, a retainer means shiftably mounted within the margins of said ball member and extending into each keyway therein, and spherical key members held by said retaining means and extending between said socket and said ball members in their respective keyways.

2. In a universal joint, a ball member, a shaft means extending therefrom, said ball member provided with a plurality of keyway channels extending in planes passing through the axis of said shaft means, a socket member adapted to receive said ball member, and a shaft extending from said socket member, said socket member provided with a plurality of keyway channels extending in planes which pass through the axis of said shaft means and registerable with the keyways in said ball member, spherical key members mounted between the keyways in said ball member and said socket member, a plurality of slits communicating between the several keyway channels in said ball member and intersecting each other substantially at the locus of said ball member, a retainer means comprising a hub portion journalled at the locus of said ball member, and arms extending from said hub portion into each of said keyway channels, each of said arms adapted to engage a spherical key member so as to maintain the several key members in a common plane.

3. In a universal joint, a ball member, a shaft means extending therefrom, said ball member provided with a plurality of keyway channels extending in planes passing through the axis of said shaft means, a socket member adapted to receive said ball member, and a shaft extending from said socket member, said socket member provided with a plurality of keyway channels extending in planes which pass through the axis of said shaft and registerable with the keyways in said ball member, spherical key members mounted between the keyways in said ball member and said socket member, a plurality of slits communicating between the several keyway channels in said ball member and retainer means mounted in said plurality of slits engageable with said spherical key members so as to maintain the several key members in a common plane.

4. In a universal joint, a ball member, a shaft means extending therefrom, said ball member provided with a plurality of keyway channels extending in planes passing through the axis of said shaft means, a socket member adapted to receive said ball member, and a shaft member extending from said socket member, said socket member provided with a plurality of keyway channels extending in planes which pass through the axis of said shaft member and registerable with the keyways in said ball member, spherical key members mounted between the keyways in said ball member and said socket member, a plurality of slits communicating between the several keyway channels in said ball member, a retainer means shiftably mounted within said slits and extending into each of said keyway channels, so as to engage said spherical key members and maintain the several key members in a common plane, and means for sealing the joint between said ball member and socket member for preventing the escape of a lubricant.

5. In a universal joint, a ball member, a shaft extending therefrom, said ball member provided with a multiplicity of keyway channels having substantially semi-circular cross sections, the longitudinal axes of said keyway channels extending in planes which pass through the axis of said shaft, the transverse axis of said keyways located on a common plane which passes through the center of said ball member transversely to said shaft, a socket member adapted to fit over said ball member, a shaft means extending from said socket member, said socket member provided with keyway channels adapted to register with the channels in said ball member, said channels having circular cross sections, the longitudinal axes of the keyway channels in said channel members extending in planes which intersect the axis of said shaft means, the transverse axes of said keyways extending in a common plane which passes through the locus of said socket transverse to the shaft means of said socket member, spherical keys positioned between corresponding keyways in said socket member and said ball member, said ball member provided with a plurality of slits communicating between said keyway channels therein, and a retainer means shiftably mounted within said slits for retaining the several spherical key members in a common plane.

6. In a universal joint, a ball member, a shaft extending therefrom, said ball member provided with a multiplicity of keyway channels having substantially semi-circular cross sections, the longitudinal axes of said keyway channels extending in planes which pass through the axis of said shaft, the transverse axis of said keyways located on a common plane which passes through the center of said ball member transversely to said shaft, a socket member adapted to fit over said ball member, a shaft means extending from said socket member, said socket member provided with keyway channels adapted to register with the channels in said ball member, said channels having circular cross sections, the longitudinal axes of the keyway channels in said channel members extending in planes which intersect the axis of said shaft means, the transverse axes of said keyways extending in a common plane which passes through the locus of said socket transverse to the shaft means of said socket member, spherical keys positioned between corresponding keyways in said socket member and said ball member, said ball member provided with a plurality of slits intersecting said keyway channels therein and intersecting each other at the center of said ball member, a retainer means comprising a hub portion journalled at the center of said ball member, arm portions extending into said slits, and means at the ends of said arm portions for retaining the several spherical key members in a common plane, and tension means for dampening the movement of said retainer means.

7. In a universal joint, a ball member, a shaft extending therefrom, said ball member provided with a multiplicity of keyway channels having substantially semi-circular cross sections, the longitudinal axes of said keyway channels extending in planes which pass through the axis of said shaft, the transverse axis of said keyways located on a common plane which passes through the center of said ball member transversely to said shaft, a socket member adapted to fit over said ball member, a shaft extending from said socket member, said socket member provided with keyway channels adapted to register with the channels in said ball member, said channels having circular cross sections, the longitudinal axes of the keyway channels in said channel members extending in planes which intersect the axis of said shaft, the transverse axes of said keyways extending in a common plane which passes through the locus of said socket transverse to the shaft of said socket member, spherical keys positioned between corresponding keyways in said socket member and said ball member, said ball member provided wth a plurality of slits intersecting said keyway channels therein and intersecting each other at the center of said ball member, a retainer means comprising a hub portion journalled at the center of said ball member, arm portions extending into said slits, and means at the ends of said arm portions for retaining the several spherical key members in a common plane, and means for sealing the joint between said ball member and said socket member for preventing the escape of lubricant therefrom.

In testimony whereof, I have hereunto set my hand at San Diego, California, this 16th day of March, 1929.

LAMBERT STERNBERGH.